(12) United States Patent  
Fukuzawa (10) Patent No.: US 8,860,361 B2
(45) Date of Patent: Oct. 14, 2014

(54) VEHICLE POWER SUPPLY SYSTEM (71) Applicant: Yosuke Fukuzawa, Tokyo (JP)

(72) Inventor: Yosuke Fukuzawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 42 days.

(21) Appl. No.: 13/851,465

(22) Filed: Mar. 27, 2013

(65) Prior Publication Data

US 2014/0117677 A1 May 1, 2014

(30) Foreign Application Priority Data

Oct. 30, 2012 (JP) ................. 2012-239318

(51) Int. Cl.
*H02J 7/14* (2006.01)
*H02P 9/00* (2006.01)

(52) U.S. Cl.
CPC ....................................... *H02P 9/00* (2013.01)
USPC .......................................................... 320/103

(58) Field of Classification Search
CPC ......................................................... H02J 7/14
USPC .......................................................... 320/104
See application file for complete search history.

(56) References Cited

U.S. PATENT DOCUMENTS

| | | | |
|---|---|---|---|
| 4,973,896 A * | 11/1990 | Shiga et al. | 322/28 |
| 5,467,008 A | 11/1995 | Uchinami | |
| 6,104,160 A * | 8/2000 | Iwata et al. | 320/103 |
| 8,058,836 B2 * | 11/2011 | Ichikawa et al. | 320/104 |
| 8,256,547 B2 * | 9/2012 | Ichikawa | 180/65.29 |
| 8,350,527 B2 * | 1/2013 | Ichikawa | 320/109 |
| 8,359,132 B2 * | 1/2013 | Laberteaux et al. | 701/22 |
| 2006/0219448 A1 * | 10/2006 | Grieve et al. | 180/65.3 |

FOREIGN PATENT DOCUMENTS

| | | | |
|---|---|---|---|
| JP | 1-106929 A | | 4/1989 |
| JP | 6-54463 A | | 2/1994 |
| JP | 2758000 B2 | | 5/1998 |
| JP | 2832408 B2 | | 10/1998 |
| JP | 2001224133 A | * | 8/2001 |
| JP | 2001231106 A | * | 8/2001 |
| JP | 3809937 B2 | | 8/2006 |
| JP | 2010-68622 A | | 3/2010 |
| WO | WO 2009028382 A1 | * | 3/2009 |

OTHER PUBLICATIONS

Japanese Office Action, issued Jan. 21, 2014, Patent Application No. 2012-239318.
Japanese Office Action, issued Sep. 3, 2013, Patent Application No. 2012-239318.

* cited by examiner

*Primary Examiner* — Joseph Waks
(74) *Attorney, Agent, or Firm* — Sughrue Mion, PLLC (57) ABSTRACT

A vehicle power supply system includes a power monitor device that detects supply power from a battery and a generator to a home electrical appliance and a control unit that performs a supply power excess determination and a supply power variance determination using a detection value of the power monitor device when a driving of a vehicle is stopped to control a rotational speed of an engine according to determination results.

10 Claims, 5 Drawing Sheets

VEHICLE POWER SUPPLY SYSTEM

BACKGROUND OF THE INVENTION

1. Field of the Invention

The present invention relates to a vehicle power supply system that supplies power from in-vehicle generator and battery to an external electrical device.

2. Background Art

There is a system in which an in-vehicle generator is used not only to supply power to electrical components, such as headlights and control devices, but also to supply power to a home electrical appliance, such as a refrigerator and a microwave oven while driving of a vehicle is stopped.

The vehicle power supply system in the related art detects a fluctuation of an electrical load of the home electrical appliance on the basis of an output of the generator, and controls a target rotational speed of an engine so that the detected output of the generator neither exceeds nor falls short of the electrical load. Hence, power comparable to the output of the generator is supplied to the home electrical appliance via a power convertor. More specifically, in a case where an electrical load of the home electrical appliance increases and an output voltage value of the generator falls below a pre-set threshold value, an engine speed is increased. On the other hand, in a case where power is excessively supplied to the home electrical appliance and an output current value falls below a threshold value, the engine speed is decreased. An example of this configuration is described, for example, in Patent Document 1.

Patent Document 1: JP-A-2010-68622

The vehicle power supply system in the related art is, however, a system that detects whether an output of the generator exceeds or falls short of the electrical load of the home electrical appliance first, and then controls the engine speed according to the detection value. Hence, power corresponding to the electrical load is not supplied at a time point when an output of the generator is detected and the power corresponding to the electrical load is supplied with a delay after the control. This configuration therefore makes it impossible to supply power quickly in response to an increase of power that the home electrical appliance requires from the generator (hereinafter, referred to as the required power). In other words, even when the home electrical appliance increases the required power from the generator, the generator fails to instantaneously supply power comparable to the required power. Hence, the home electrical appliance cannot perform an operation to be accomplished with the required power until the control according to a new detection value is performed. Further, in the case of a home electrical appliance that needs large power at start-up, for example, a home electrical appliance that drives a motor, the home electrical appliance may not be started by an output of the generator at start-up. Also, in the case of a small-size engine, such as the one in a motorcycle, an abrupt increase of the required power causes a load torque of the engine to increase and such an increase of the load torque decreases speeds of the generator and the engine. Hence, there is a risk that the engine stops before the engine speed is controlled (a phenomenon so-called engine stall).

SUMMARY OF THE INVENTION

The invention was devised to solve the problems discussed above and has an object to obtain a vehicle power supply system capable of supplying power quickly in response to a variance of required power of an external electrical device.

A vehicle power supply system according to one aspect of the invention is a vehicle power supply system that supplies power from a generator driven by an internal combustion engine to an external electrical device through power conversion. The vehicle power supply system includes: a battery that is charged by the generator and supplies the external electrical device with power in response to an increase of power required by the external electrical device; a stop state detection portion that detects a drive stop state of the vehicle; a current detection unit that detects a supply current from the battery and the generator to the external electrical device; a supply current excess determination unit that calculates a charge and discharge state of the battery on the basis of whether the supply current exceeds or falls short of a generation current of the generator using a detection result of the current detection unit; a supply current variance determination unit that calculates a variation of the supply current using the detection result of the current detection unit; and a control unit that controls a rotational speed of the internal combustion engine according to a calculation result of the supply current excess determination unit and a calculation result of the supply current variance determination unit when the stop state detection portion detects a drive stop state of the vehicle.

The vehicle power supply system configured as above is capable of steadily supplying power quickly in response to a variance of required power of an external electrical device.

The foregoing and other objects features, aspects, and advantages of the present invention will become more apparent from the following detailed description of the present invention when taken conjunction with the accompanying drawings.

DETAILED DESCRIPTION OF THE PREFERRED EMBODIMENT

Hereinafter, an embodiment of the invention will be described with reference to the drawings. In the drawings, equivalent or corresponding components and parts are labeled with the same reference numerals.

First Embodiment

Figure 1:
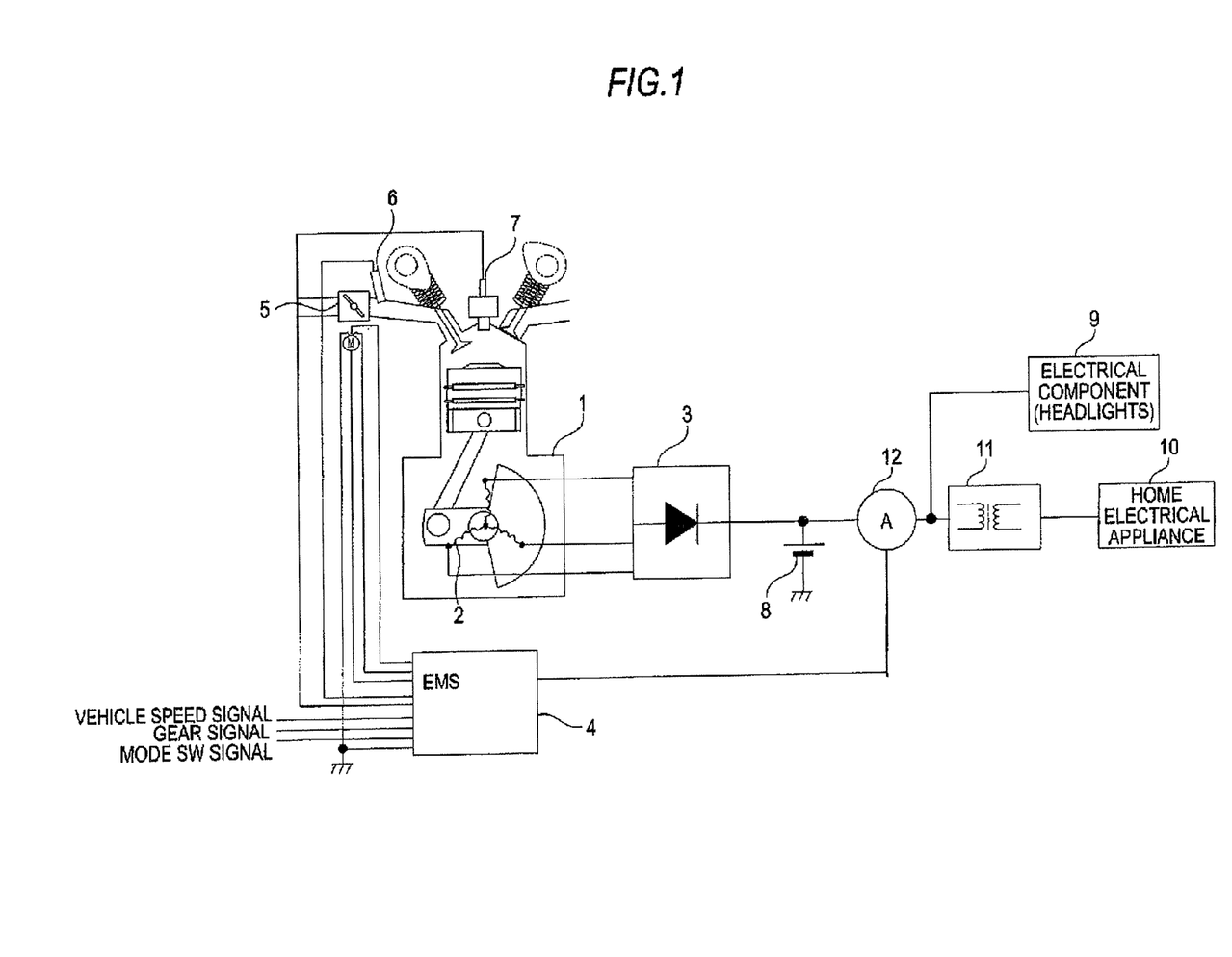
FIG. 1 is a view schematically showing a vehicle power supply system according to a first embodiment of the invention.

FIG. 1 is a view schematically showing a vehicle power supply system according to a first embodiment of the invention. In the first embodiment, a motorcycle is used as an example of the vehicle hereinafter.

Referring to FIG. 1, a generator 2 is connected to an output shaft of an engine 1 as an internal combustion engine. When the output shaft of the engine 1 rotates due to combustion of fuel, the generator 2 starts to rotate and generates power.

Power thus generated is converted from AC to DC in a rectifier and a regulator 3 and regulated to stay at a constant voltage (for example, 12 v or 24 v). The engine 1 is driven by an engine management system (hereinafter, abbreviated to EMS) 4 by controlling an electronic throttle 5, injectors 6, spark plugs 7, and so on according to various signals, such as a vehicle speed signal, a gear signal, and a mode SW signal.

The generated and regulated power is charged to a battery 8, fed to an electrical component 9, such as headlights, or fed to a home electrical appliance 10, such as a refrigerator and a microwave oven, as an external electrical device. Power may be charged and fed at the same time and the regulator 3 also plays a role of preventing an overcharge of the battery 8 in a fully charged state. Herein, in a case where power is fed to the home electrical appliance 10, DC power is converted by a DC-to-AC convertor 11 to AC power usable by the home electrical appliance 10. Power supplied to the electrical component 9 or the home electrical appliance 10 (hereinafter, referred to supply power) is detected by a power monitor device 12. The power monitor device 12 is connected to the EMS 4 and notifies the EMS 4 of the supply power.

Upon notification of the supply power, the EMS 4 starts to control an engine speed by driving a motor of the electronic throttle 5 according to the supply power under the control. Herein, because the voltage is constant, the power monitor device 12 is used as a power detection portion. It should be appreciated, however, that an ammeter or any suitable instrument that detects a current supplied to the home electrical appliance 10 may be used instead.

Figure 2:
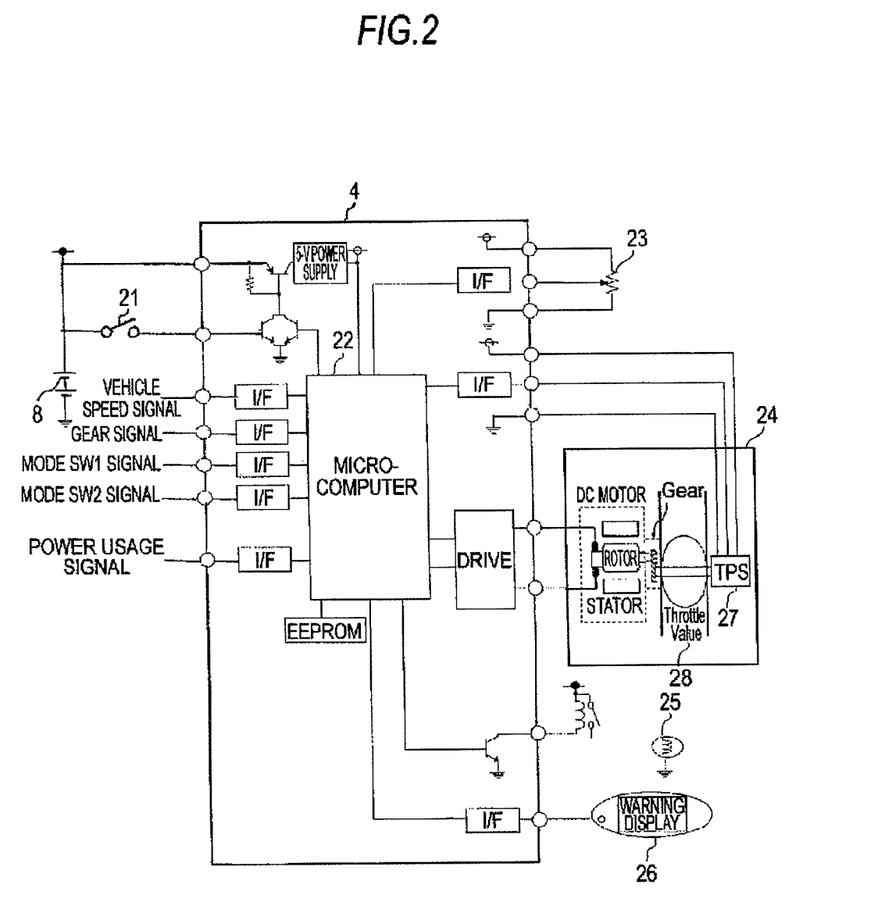
FIG. 2 is a view showing a configuration of an EMS in the vehicle power supply system according to the first embodiment of the invention.

FIG. 2 is a view showing a configuration of the EMS 4 in the vehicle power supply system according to the first embodiment of the invention, more specifically, a view showing in detail a connection of the EMS 4 of FIG. 1 and peripheral devices.

The EMS 4 receives power from the battery 8. Of two connection lines connecting the EMS 4 and the battery 8, one connection line can be switched ON and OFF by a user using a key SW 21. Within the EMS 4, various types of control are performed chiefly by a micro-computer 22 and a signal, such as a supply power signal detected by the power monitor device 12, is inputted into the micro-computer 22. Signals inputted into the micro-computer 22 include a mode SW1 signal and a mode SW2 signal used to detect switching among a drive mode, a feed mode, and a self-charge mode described below. Meanwhile, control signals are outputted from the micro-computer 22 to an accelerator position sensor 23, a throttle body 24, headlights 25, a meter ASSY 26, and so on. In a case where power is supplied to the electrical component 9 and the home electrical appliance 10, a rotational speed of the engine 1 is controlled by driving a throttle valve 28 using a DC motor while obtaining an opening signal of the throttle valve 28 at a throttle position sensor 27 in the throttle body 24.

Figure 3:
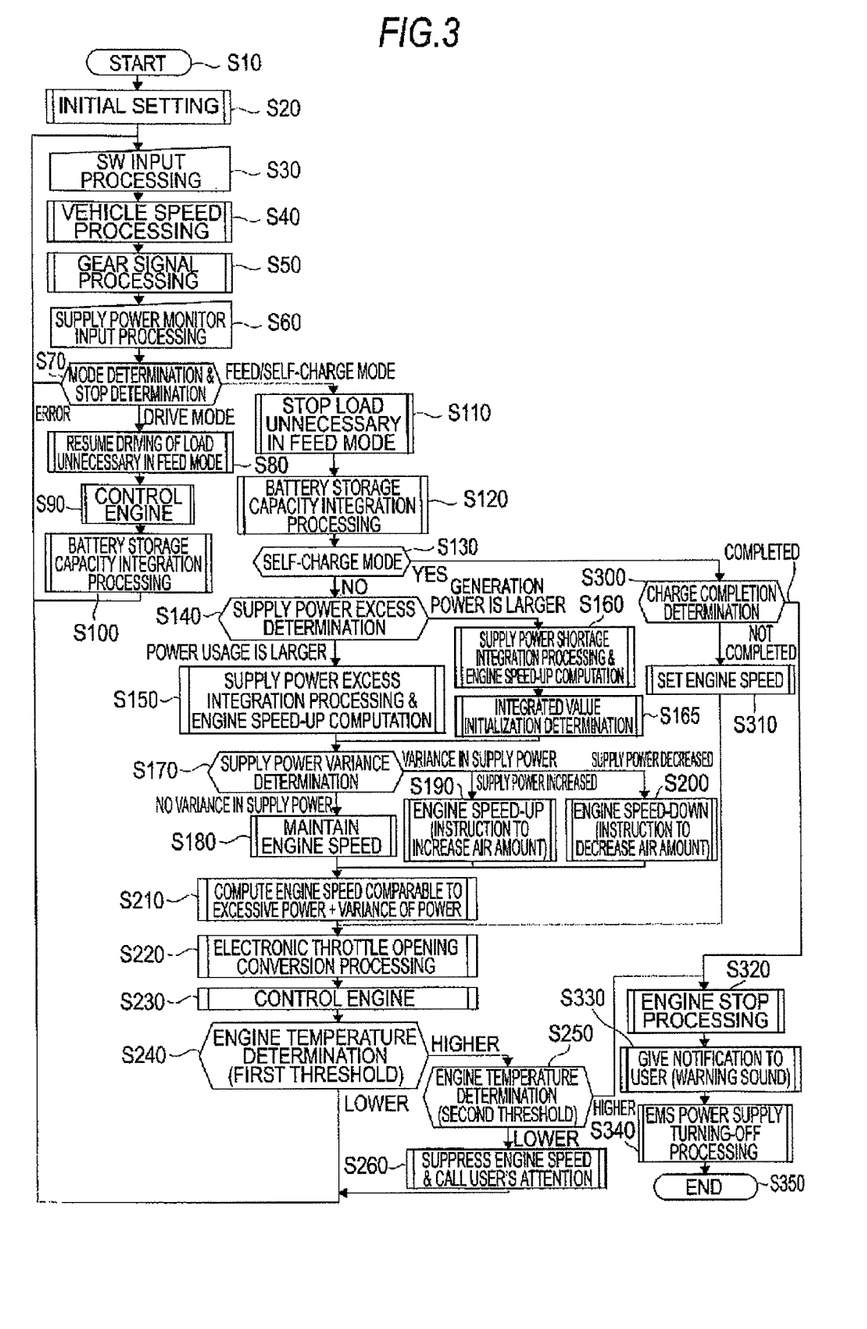
FIG. 3 is a flowchart of the EMS in the vehicle power supply system according to the first embodiment of the invention.
Figure 4:
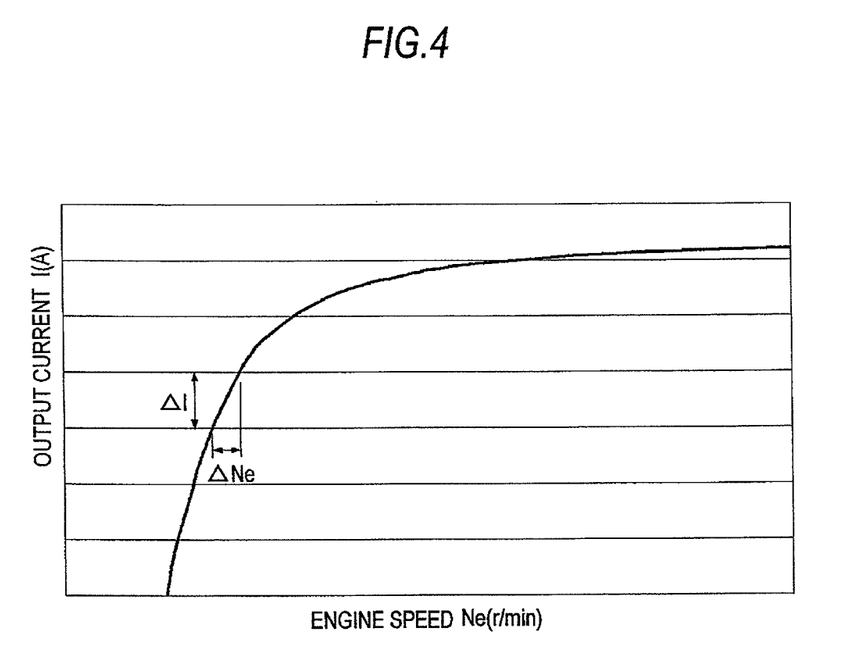
FIG. 4 is a view showing a correlation of an engine speed with respect to an output current.

FIG. 3 is a flowchart of the EMS 4 in the vehicle power supply system according to the first embodiment of the invention. FIG. 4 shows a correlation of an engine speed with respect to an output current (of the generator 2).

In the flowchart of FIG. 3, the EMS 4 starts when the key SW 21 is switched ON in S10. The EMS 4 that has started performs own initial settings in S20 and confirms a state of the vehicle and a mode to be performed by the processing below (S30 through S50). The confirmation is performed by wire communications using signals inputted into the EMS 4 as are shown in FIG. 1 and FIG. 2. It should be appreciated, however, that the confirmation may be performed by wireless communications. The mode to be performed is, for example, the drive mode in which the vehicle is normally driven, the feed mode in which the generator 2 generates power and the power is supplied to the home electrical appliance 10, and the self-charge mode in which the generator 2 generates power and the power is supplied to the battery 8.

Firstly, SW input processing is performed in S30. This processing is performed for the EMS 4 to detect which one of the signals respectively instructing to perform the drive mode, the feed mode, and the self-charge mode is inputted therein. For example, the key SW 21 is provided not only with SW's assigned to switch OFF and switch ON to perform the drive mode, but also with SW's assigned to perform the feed mode and the self-charge mode. The EMS 4 detects in which of the drive mode, the feed mode, and the self-charge mode the key SW 21 is positioned. The modes may be switched on a dashboard or a meter. Alternatively, in a case where the engine 1 and the generator 2 are already driving, it may be configured in such a manner that the EMS 4 determines that an attempt is being made to extract power on the ground that the power monitor device 12 detects power, and therefore detects that the vehicle power supply system is being used in the feed mode or the self-charge mode.

Subsequently, by vehicle speed signal processing and gear signal processing in S40 and S50, respectively, the EMS 4 acquires information used to confirm that the vehicle is in a stop state in which it is safe to shift the mode to the feed mode or the self-charge mode. More specifically, whether the vehicle speed is equal to or below a set value and the gear is shifted in neutral is detected on the basis of the vehicle speed signal and the gear signal. In a case where a vehicle speed sensor that detects a vehicle speed signal is not provided, a vehicle speed may be determined by detecting an engine speed in S40.

Communications with the power monitor device 12 are enabled in S60. In S70, a mode determination and a stop determination are made on the basis of the information acquired in S30 through S50 above, and switching to the drive mode, the feed mode, or the self-charge mode is performed. Herein, an error is determined, for example, in a case where the vehicle speed is higher than the set value or the gear is not shifted in neutral even when the user has switched the key SW 21 to the feed mode, that is, when it is determined that shifting to the drive mode or to the feed or self-charge mode is not allowed. Hence, the flow returns to S30.

(A) Drive Mode

In the drive mode, the vehicle is allowed to drive normally while the following processing (S80 through S100) is performed in the EMS 4. In S80, driving of the electrical component 9 unnecessary in the feed mode or the self-charge mode is resumed or continued. Examples of the electrical component 9 unnecessary in the feed mode or the self-charge mode include but not limited to headlights, tail lamps, an audio system, grip sheets, and heater sheets. The existing headlights and tail lamps are configured to automatically light ON even in daylight to enhance visibility.

When the engine 1 starts, engine control for normal drive is performed in S90 according to an operation on the accelerator by the user. In S100, processing as follows is performed as battery storage capacity integration processing. That is, power charged to and discharged from the battery 8 is integrated (accumulative calculation) on the basis of a detection value of the power monitor device 12 while the engine 1 is controlled to find an integrated value Ps in accordance with an equation below. On the basis of the integrated value Ps thus found, a charge time of the battery 8 by the generator 2 in the self-charge mode described below is determined. In the equation below, Ps(n) denotes a present value of the integrated value, Ps(n−1) denotes a last value of the integral value, Pout denotes generation power by the generator 2, and Pu denotes supply power detected by the power monitor device 12.

$$Ps(n)=Ps(n-1)+Pout-Pu$$

Referring to FIG. 1, the power monitor device 12 is not connected to the home electrical appliance 10 in the drive mode and therefore the supply power Pu in this mode is the power supplied to the electrical component 9. The generation power Pout of the generator 2 is calculated on the basis of a rotational speed of the engine 1 under the control and there is a relation as is shown in FIG. 4 between an output current of the generator 2 and the engine speed. Herein, because an output voltage is constant, the output current and the generation power Pout have a correlation. For example, referring to FIG. 4, in a case where it is desirable to increase the output current of the generator 2 by ΔI, the engine speed is increased by ΔNe. Hence, it is not necessary to detect the generation power Pout using a power meter and the generation power Pout is calculated on the basis of the engine speed. It is understood from the equation above that when Ps(n)<0, discharged power of the battery 8 is larger than that in the initial state and the battery 8 needs charging.

(B) Shifting to Feed Mode or Self-Charge Mode

When the mode is shifted to the feed mode or the self-charge mode according to the mode determination and the vehicle stop determination in S70, power generated by the generator 2 is supplied to the battery 8 or the home electrical appliance 10. The EMS 4 first stops the electrical component 9 unnecessary in the feed mode or the self-charge mode, such as headlights 25, in S110. It should be appreciated that the electrical component 9 may be placed in a state where driving is allowed as the need arises. For example, because the in-vehicle radio is an information source in a time of disaster, the radio may not be stopped and driven continuously. Alternatively, it may be configured so as to enable the user to select whether the electrical component 9 is stopped or driven continuously.

Because the generator 2 generates power, as the battery storage capacity integration processing, processing as follows is performed in S120. That is, power charged to and discharged from the battery 8 is integrated (accumulative calculation) on the basis of a detection value of the power monitor device 12 to find the integrated value Ps in accordance with an equation below. Referring to FIG. 1, because a supply of power to the electrical component 9 is stopped, the supply power Pu in the feed mode is the power supplied to the home electrical appliance 10 and also corresponds to the required power that the home electrical appliance 10 requires from the generator 2 and the battery 8. In the self-charge mode, supply power is entirely used to charge the battery 8. At a point immediately after the shifting from the drive mode to the feed mode or the self-charge mode, the present value Ps(n) of the integrated value is calculated using the last value Ps(n−1) of the integrated value in the drive mode.

$$Ps(n)=Ps(n-1)+Pout-Pu$$

(C) Feed Mode

In the feed mode, the EMS 4 controls a rotational speed of the engine 1 in response to a variance of the required power of the home electrical appliance 10 and feeds power generated by the generator 2 to the home electrical appliance 10. When the engine 1 has just started, the generator 2 is slightly generating power due to idle rotations of the engine 1. In a case where generation power by the idle rotations is sufficient to supply the home electrical appliance 10 with power as required, the rotational speed of the engine 1 is maintained. However, in a case where the home electrical appliance 10 requires large power, the EMS 4 controls the engine 1 to increase the rotational speed.

In S130, it is first determined whether the mode is the self-charge mode or not. In a case where a determination result is "NO", the mode is shifted to the feed mode. Subsequent S140 through S165 specifically describe a means for supply power excess determination. As the supply power excess determination in S140, the supply power Pu detected by the power monitor device 12 is compared with the generation power Pout calculated on the basis of the rotational speed of the engine 1.

When Pu>Pout, it is a state where the battery 8 is discharging and power is supplied to the home electrical appliance 10 from the generator 2 and the battery 8. Hence, the flow proceeds to S150. On the other hand, when Pout>Pu, it is a state where the battery 8 is charging and power is supplied to the home electrical appliance 10 from the generator 2. Hence, the flow proceeds to S160.

When Pu>Pout, supply power excess integration processing in S150 is performed to compute an integrated value $P_0(n)$ of an excess of the supply power to the home electrical appliance 10 out of the generation power of the generator 2 in accordance with an equation below. The excess, (Pu−Pout), is supplied from the battery 8. Herein, the integrated value $P_0(n)$ corresponds to discharge power out of an initial storage amount of the battery 8.

$$P_0(n)=P_0(n-1)+(Pu-Pout)$$

Likewise, supply power shortage integration processing in S160 is performed when Pu<Pout also in accordance with the equation above to compute the integrated value $P_0(n)$. Herein, it is a state where supply power is less than (falls short of) the generation power and the shortage, (Pout−Pu), is charged to the battery 8.

In the processing in S150 and S160, when the integrated value is $P_0(n)>0$, because the current storage capacity of the battery 8 is less than the initial storage capacity of the battery 8, a variation $NE_0$ by which to increase a rotational speed of the engine 1 is computed according to the integrated value $P_0(n)$ so that the battery 8 is charged. A relational expression in a one-to-one correspondence as is shown in FIG. 4 is established between the integrated value $P_0(n)$ and the variation $NE_0$ of the engine speed. Hence, the variation $NE_0$ of the engine speed can be readily determined in accordance with the relational expression. Also, either when Pu>Pout or when Pu<Pout, the home electrical appliance 10 is supplied with power comparable to the required power.

In the case of S160, the integrated value can be $P_0(n)<0$ from the relation of Pu<Pout. However, assume that the initial storage state of the battery 8 is a fully charged state, then the battery 8 can no longer be charged. Hence, the battery 8 is not charged even when the integrated value is $P_0(n)<0$. Accordingly, a difference is generated between a storage amount of the battery 8 in the integration processing thereafter and the actual storage amount. To eliminate this inconvenience, in S165, the integrated value is initialized (cleared), $P_0(n)=0$, only when the integrated value is $P_0(n)<0$. Then, the flow returns to the subsequent processing in the flowchart. In a case where the integrated value is other than $P_0(n)<0$, merely the variation $NE_0$ by which to increase the rotational speed of the engine 1 is computed. It should be noted, however, that in a case where the initial storage state of the battery is not a fully charged state, there is no need of initialization even when the integrated value becomes $P_0(n)<0$.

A sequence of the supply power excess determination makes it possible to charge the battery 8 in a stable manner by confirming a charge and discharge state of the battery 8 while the home electrical appliance 10 is supplied with power. Hence, even when an output of the generator 2 alone is insufficient to feed the home electrical appliance 10 as required until the next control opportunity, the battery 8 always makes an instantaneous response so as to feed the home electrical appliance 10 as required.

Subsequent S170 through S200 specifically describe the means for the supply power variance determination. As the supply power variance determination in S170, the last value $Pu(n-1)$ and the present value $Pu(n)$ of the supply power Pu detected by the power monitor device 12 are compared and a variation of the engine speed corresponding to the difference is determined. There is a relational expression in a one-to-one correspondence as is shown in FIG. 4 between the difference and a variance of the engine speed, NEdlt. Hence, the variation of the engine speed, NEdlt, can be readily determined in accordance with the relational expression.

In a case where there is no variance of the supply power, that is, when $Pu(n-1)=Pu(n)$, engine speed maintaining processing in S180 is performed. Accordingly, the rotational speed of the engine 1 is maintained as expressed by an equation below for a variance of the supply power and a command to increase or decrease the engine speed is not issued. In the equation below, NEdlt denotes a variation of the engine speed in response to a variance of the supply power.

$$NEdlt=0$$

In a case where the supply power is increased, that is, when $Pu(n-1)<Pu(n)$, engine speed-up processing in S190 is performed. For a variance of the supply power, an increase (UP) amount of the engine speed, $\Delta NE$, corresponding to the difference between the last value and the present value is determined in accordance with an equation as follows:

$$NEdlt=\Delta NE.$$

In a case where the supply power is decreased, that is, when $Pu(n-1)>Pu(n)$, engine speed-down processing in S200 is performed. For a variance of the supply power, a decrease (DOWN) amount of the engine speed, $\Delta NE$, corresponding to the difference between the last value and the present value is determined in accordance with an equation as follows:

$$NEdlt=-\Delta NE.$$

The purpose of the supply power excess determination in S140 above is to charge the battery 8 by controlling the engine speed for discharge power of the battery 8 due to feeding from the battery 8 to the home electrical appliance 10. On the contrary, the purpose of the supply power variance determination in S170 above is to address a variance of the supply power by generation power of the generator 2 alone after the control. Owing to these two determinations, it becomes possible to steadily supply the home electrical appliance 10 with power corresponding to the required power using the generator 2 and the battery 8. In this instance, because a variance of the supply power is addressed by the generation power of the generator 2 alone after the control, feeding from the battery 8 is suppressed. Hence, even when the battery 8 has a small capacity, there is less risk that the battery 8 becomes out of charge. Also, in a case where the required power temporarily exceeds the maximum generation power of the generator 2, the generator 2 together with the battery 8 is capable of supplying the home electrical appliance 10 with power corresponding to the required power.

The engine speed NE to be controlled is determined in S210 on the basis of the results of the supply power excess determination in S140 above and the supply power variance determination in S170 above. Firstly, a variation of the engine speed obtained by the determinations in S140 and S170 above is found as $NE_0+NEdlt$. Then, the present value $NE(n)$ of the engine speed is found in accordance with an equation below by including the last value $NE(n-1)$ of the engine speed.

$$NE(n)=NE(n-1)+NE_0+NEdlt$$

In S220, an opening of the electronic throttle 5 is determined on the basis of the present value $NE(n)$ of the engine speed found in S210 above. Then, the engine 1 is run under the control by setting the opening of the electronic throttle 5 thus determined as the target in S230.

A variation of the engine speed is determined in consideration of deterioration of exhaust gas and influences on the battery 8. An abrupt variance of the engine speed causes deterioration of exhaust gas and shortens the life of the battery 8 due to rapid charging of the battery 8. A variance of the engine speed may be made gentle to avoid such inconveniences. For example, generation power of the generator 2 becomes smaller when the engine speed is increased gently than when the engine speed is increased abruptly. However, a shortage of the supply power to the home electrical appliance 10 is covered by the feeding from the battery 8. Also, because the feeding takes place in a stop state, it is desirable that the engine 1 is of a water-cooled type that can be cooled sufficiently even in a stop state. In a case where the engine 1 is of an air-cooled type, the engine 1 is not cooled sufficiently when the engine speed is increased abruptly. To eliminate this inconvenience, the engine speed may be increased gently. In the case of a vehicle having a mechanism that allows the vehicle to start moving when the engine speed becomes high using a centrifugal clutch as the transmission, the control is performed within a range of the engine speed in which the vehicle is not allowed to start.

(D) Self-Charge Mode

In the self-charge mode, the key SW 21 is at the position at which the self-charge mode is performed. In this mode, power generated by the generator 2 is supplied to neither the electrical component 9 nor the home electrical appliance 10 and used to charge the battery 8.

In consideration of self-discharge of the battery 8, whether charging of the battery 8 is completed or not is determined in S300 by detecting a battery voltage. In a case where the self-discharge is not concerned, a charging condition may be determined on the basis of the integrated value $Ps(n)$ of charging and discharging of the battery 8. In a case where the charging is not completed, the flow proceeds to S310 in which a charge amount in the self-charge mode is found on the basis of the integrated value $Ps(n)$ of power charged to and discharged from the battery 8 found in the battery storage capacity integration processing in S100 and S120 above and an engine speed corresponding to the charge amount is set. After the engine speed is set, an opening of the electronic throttle 5 is determined in S220 and the engine is controlled in S230 in the same manner as in the feed mode.

When the charging is completed in the self-charge mode, engine stop processing is performed in S320. Further, processing to notify the user of the completion of the charging is performed in S330. The user is notified by a display on the meter or by a sound, such as honking horns and beeps.

When the notification to the user ends, processing to turn OFF the power supply of the EMS 4 is performed in S340. In the self-charge mode, it is possible to set the EMS 4 to continue the charging even when the key SW 21 is switched OFF after the charging starts, more specifically, even when the user removes the key from the motorcycle and leaves the motorcycle. As is shown in FIG. 2, there are two connection lines between the battery 8 and the EMS 4. Even when the key SW 21 is switched OFF as the key is removed from the motorcycle, power is kept supplied from the battery 8 to the EMS 4. When configured in such a manner that the engine 1 is controlled while power is supplied to the EMS 4 and the engine 1 is stopped upon completion of the charging, there is no need to supply power to the EMS 4 from the battery 8. Accordingly, of the two connection lines, the connection line that does not include the key SW 21 is electrically disconnected according to a command from the EMS 4 to turn OFF the power supply of the EMS 4. After the processing as above is performed, the flowchart of the EMS 4 is ended in S350.

The engine control is performed in S230. However, for example, in the case of a motorcycle adopting an air-cooled engine, peripheral components may possibly be adversely affected by heat due to a temperature rise in the engine 1 and exhaust pipes. In a case where there is dried-grass near where the vehicle is stopped, such a temperature rise can cause a fire. To avoid such inconveniences, processing to suppress the engine speed and processing to stop the engine 1 are performed in reference to a certain threshold by monitoring an engine temperature.

In S240, processing to determine the engine temperature is performed and whether the engine temperature is higher or lower than a first threshold is determined. In a case where the engine temperature is lower than the first threshold, the flow returns to S30 in the flowchart. Ina case where the engine temperature is higher than the first threshold, whether the engine temperature is higher or lower than a second threshold is further determined in S250. The second threshold is set to a temperature higher than that of the first threshold. In a case where the engine temperature is lower than the second threshold, the engine speed is suppressed in S260 and a warning is given to the user by an alarm or any other appropriate means. In a case where it is necessary to suppress the engine speed even when the engine speed is to be increased as the result of computation in S210, generation power of the generator 2 falls short of the supply power to the home electrical appliance 10. However, a shortage is covered by the feeding from the battery 8.

In a case where the engine temperature is higher than the second threshold, the engine stop processing is performed in S320 to lower the engine temperature. By continuously monitoring the engine temperature afterward, it also becomes possible to return the mode to the feed mode or the self-charge mode again when the engine temperature drops below a certain threshold.

Each processing in the flowchart above is performed as the need arises and may not be performed in some cases. For example, in a case where a storage state of the battery 8 is determined by merely detecting a battery voltage, it is possible to omit the battery storage capacity integration processing in S100 and S120 above. In this case, the engine speed is controlled on the basis of the battery voltage in the self-charge mode. Also, a notification to the user in S260 and S330 above may be also omitted. Further, in the case of a water-cooled engine, when the necessity of attending to the engine temperature is not great, the determination processing of the engine temperature in S240 and S250 above may be omitted, too.

In a sequence of the supply power excess determination from S140, merely the supply power Pu and the generation power Pout may be compared with each other without performing the supply power excess integration, so that the variation $NE_0$ of the rotational speed of the engine 1 is computed according to a difference between Pu and Pout. According to the supply power excess determination in this instance, an increase (UP) amount $NE_0$ of the engine speed is determined when Pout>Pu on the ground that the battery 8 is in a discharge state. On the other hand, a decrease (DOWN) amount $NE_0$ is determined when Pout<Pu on the ground that the battery 8 is in a charge state.

Figure 5:
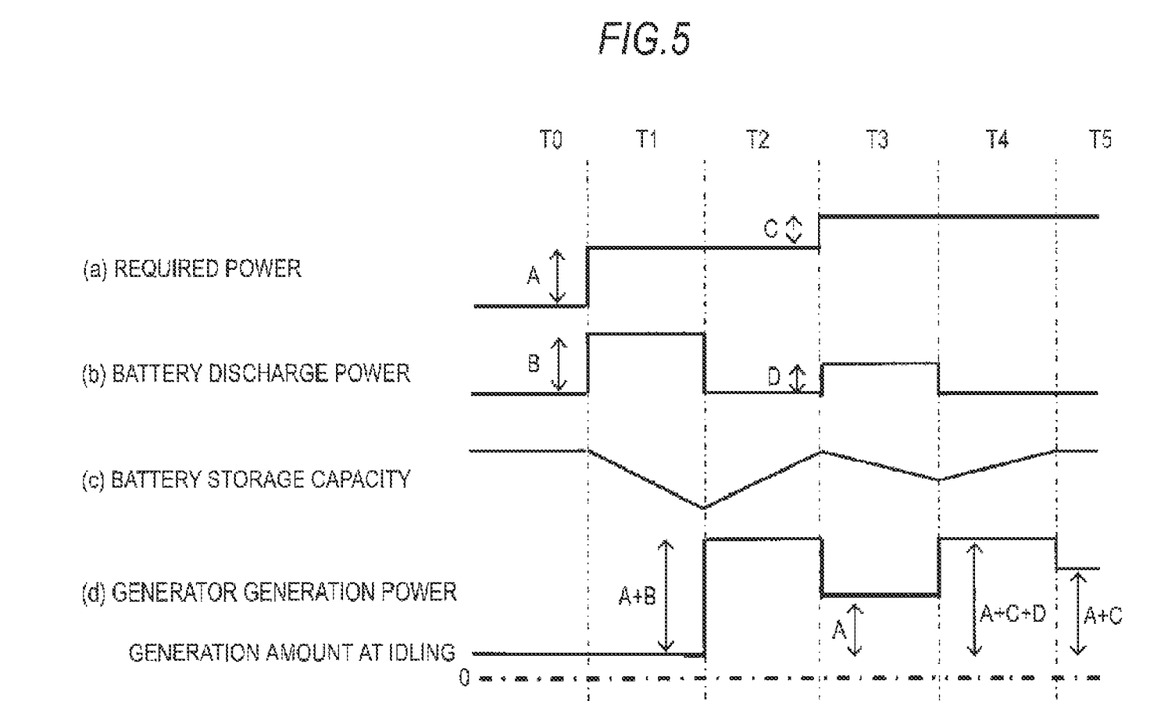
FIG. 5 is a view showing time charts of the vehicle power supply system according to the first embodiment of the invention.

FIG. 5 is a view showing time charts of the vehicle power supply system according to the first embodiment of the invention. This drawing shows that the generator 2 generates power and the battery 8 charges and discharges correspondingly to the required power of the home electrical appliance 10 in the feed mode.

Referring to FIG. 5, (a) is a time chart of the required power of the home electrical appliance 10 (also corresponding to the supply power), (b) is a time chart of discharge power of the battery 8, (c) is a time chart of the storage capacity of the battery 8, and (d) is a time chart of generation power of the generator 2. The EMS 4 controls the engine speed according to the flowchart of FIG. 3 by monitoring the power monitor device 12 at regular time intervals.

Initially, in a period T0, the home electrical appliance 10 does not require power and the battery 8 is in a fully charged state while the generator 2 generates power slightly due to idle rotations. In a period T1, the required power of the home electrical appliance 10 increases by A. Then, the battery 8 responds to this increase instantaneously and feeds discharge power B to the home electrical appliance 10. The control of the engine speed by the EMS 4 is to control the following period according to a result of the power variance in the preceding period. Hence, the EMS 4 increases the engine speed in a period T2 so that the generator 2 increases generation power by A+B from the generation power at idling in response to power variances of the home electrical appliance 10 and the battery 8 in the period T1. Herein, the generation power is increased by A according to the supply power variance determination and the generation power is increased by B according to the supply power excess determination. Also, the increase A of the generation power and the discharge power B of the battery 8 are equal power.

In a period T3, because the storage capacity of the battery 8 is restored, the variation $NE_0$ to be increased according to the supply power excess determination is eliminated and, in turn, the engine speed is lowered so that the generation power of the generator 2 decreases by B. On the other hand, because the home electrical appliance 10 increases the required power by C in the period T3, the battery correspondingly feeds discharge power D to the home electrical appliance 10. In response to these power variances, the EMS 4 controls the generator 2 to increase generation power by C+D in a period T4 and controls the generator 2 to decrease generation power by D in a period T5. Herein, the increase C of the generation power and the discharge power D of the battery 8 are equal power. In this manner, because power is supplied to the home electrical appliance 10 from the generator 2 and the battery 8 for the power required by the home electrical appliance 10, the required power of the home electrical appliance 10 and the supply power of the generator 2 and the battery 8 always coincide with each other.

As has been described, according to the vehicle power supply system configured as above, the battery charged by the generator supplies power to an external electrical device in response to an increase of the power required by the external electrical device. More specifically, before the EMS 4 controls the engine speed for an increase of the required power of the home electrical appliance 10, that is, before the generator 2 responds to an increase of the required power, the battery 8 supplies power corresponding to the increase of the required power. Hence, even when the generator 2 alone fails to instantaneously address an increase of the required power of the home electrical appliance 10, it becomes possible to supply power quickly in response to a variance of the required power of the home electrical appliance 10. In other words, even when the required power of the home electrical appliance 10 increases to the extent that the required power of the home electrical appliance 10 temporarily exceeds the supply power of the generator 2 alone, it becomes possible to make the required power of the home electrical appliance 10 equal to the supply power of the generator 2 and the battery 8. Herein, the description has been given by using the home electrical appliance 10 as an example of the external electrical device. It should be appreciated, however, that the external electrical device is not limited to this example and means electrical devices in general that are not mounted on the own vehicle. For example, the external electrical device includes medical devices and radio communication base stations. Further, it is also possible to supply power to an electrical component mounted on another vehicle.

According to this embodiment, the vehicle power supply system includes a supply current excess determination unit that calculates a charge and discharge state of the battery on the basis of whether a supply current exceeds or falls short of a generation current of the generator using a detection result of a current detection unit, and a supply current variance determination unit that calculates a variation of the supply current using the detection result of the current detection unit. A control unit controls a rotational speed of an internal combustion engine according to calculation results of the supply current excess determination unit and the supply current variance determination unit. In short, the engine speed is controlled by performing not only the supply power variance determination but also the supply power excess determination. In a case where the engine speed is controlled according to the supply power variance determination alone, there is a risk that the battery 8 is not charged appropriately and the battery 8 becomes out of charge, thereby failing to supply the home electrical appliance 10 with power corresponding to the required power. To avoid such an inconvenience, the engine speed is controlled by also performing the supply power excess determination that determines a charge and discharge state of the battery 8 so that the battery 8 is charged in a stable manner. Consequently, it becomes possible to steadily supply the home electrical appliance 10 with power corresponding to the required power. This configuration also prevents wasteful consumption of fuel as a result when the generator 2 generates power excessively for the home electrical appliance 10 and the battery 8.

Also, the vehicle power supply system includes a stop state detection portion that detects a drive stop state of the vehicle. The control unit controls a rotational speed of the internal combustion engine when the stop state detection portion detects a drive stop state of the vehicle. More specifically, the mode is shifted to the feed mode or the self-charge mode after it is confirmed that the vehicle is in a stop state in which it is safe to shift the mode to the feed mode or the self-charge mode. This configuration prevents an inconvenience that the vehicle starts moving abruptly against the user's intention in the feed mode or the self-charge mode and therefore makes it possible to supply the home electrical appliance 10 with power safely.

Also, the vehicle power supply system includes a current detection unit (or power detection portion) that detects a supply current (or supply power) from the battery and the generator to the external electrical device. The control unit controls a rotational speed of the internal combustion engine according to the detection result of the current detection unit.

More specifically, the vehicle power supply system includes the power monitor device 12 corresponding to the power detection portion and the EMS 4 performs the supply power variance determination and the supply power excess determination by controlling the power monitor device 12 to detect the supply power to the home electrical appliance 10. According to these determinations, the EMS 4 controls the engine speed to enable the generator to generate power corresponding to desired generation power. In this instance, a sum of the generation power and the charge and discharge power of the battery 8 is equal to the supply power (also corresponding to the required power). Hence, the generation power can be readily found on the basis of the correlation (FIG. 4) with the engine speed, and the supply power is calculated by the power monitor device 12. Accordingly, the charge and discharge power of the battery 8 can be calculated without having to use a detector. Hence, in the feed mode, the supply power is the only one parameter to be detected when the supply power variance determination and the supply power excess determination are performed. Accordingly, because devices for detection can be reduced, the configuration can be simpler and the control also becomes simpler. In this embodiment, power is detected. However, because the voltage is substantially constant, a current may be detected instead. Because a current is detected also by the power detection portion, the current detection unit referred to herein includes the power detection portion. A degree of accuracy of the control on a rotational speed of the engine becomes higher by detecting power than by detecting a current just because it is desirable to generate power by the generator 2 according to the actually supplied power. On the other hand, the manufacturing costs are lower by detecting a current than by detecting power because a current can be detected by a simple configuration.

In this embodiment, it is necessary to detect the engine speed to find the generation power and it is also necessary to provide the battery 8 that supplies power to the home electrical appliance 10. These function and device are, however, basically furnished to and provided to a vehicle irrelevantly to this embodiment and therefore by no means are new configurations provided particularly for this embodiment. It thus becomes possible to obtain the advantages described above using many existing devices and a need to change the fabrication sequence markedly is eliminated. Also, because there are only a few devices, such as the power monitor device 12, that need to be added as new configurations, it becomes possible to save the production costs.

In addition to the configuration achieving the advantages described above, in this embodiment, the supply power excess determination portion integrates a difference between the supply power and the generation power and uses the integrated value as the calculation result. More specifically, by integrating a difference between the supply power and the generation power in the supply power excess integration processing or in the supply power shortage integration processing in the supply power excess determination, whether the battery 8 is charged or discharged with respect to an initial storage state of the battery 8 can be calculated. Because the engine speed is controlled according to this calculation result, it becomes possible to perform the control that suits the present storage state of the battery 8. For example, the engine speed may be controlled according to a difference between the supply power and the generation power (when supply power>generation power) in one control period (for example, the period T1 of FIG. 5) without calculating the integrated value. In this case, however, unless power equal to the difference is charged to the battery 8 within the following one control period (for example, the period T2 of FIG. 5), a discrepancy of the charge state of the battery 8 cannot be eliminated in the subsequent controls and there is a risk that a stable storage state of the battery 8 cannot be maintained. It is therefore necessary to charge power equal to the difference to the battery 8 within one control period. To this end, the battery 8 may be charged rapidly and rapid charging of the battery 8 possibly shortens the life of the battery 8. On the contrary, by controlling the engine speed by calculating the charge and discharge state of the battery 8 on the basis of the integrated value, it also becomes possible to charge the battery 8 over more than one control period (for example, the periods T2 through T4 of FIG. 5). Hence, it is not necessary to charge the battery 8 rapidly. The embodiment above has been described on the assumption that the initial storage state of the battery 8 is a fully charged state and the battery 8 is not charged more than the initial storage state. The invention, however, is not limited to the foregoing description and it is also possible to calculate a charge and discharge state of the battery on the basis of the integrated value including a case where the battery 8 is charged more than the initial storage state.

Also, the supply power excess determination portion may also determine whether the battery is in a charge state or a discharge state when a difference between the supply power and the generation power is calculated on the basis of the difference and may use the difference as the calculation result. More specifically, in the supply power excess determination, the supply power excess integration processing and the supply power shortage integration processing are not performed and the battery 8 is determined as being in a discharge state when the supply power Pu> the generation power Pout, whereas the battery 8 is determined as being in a charge state when Pout>Pu. In this instance, a variation $NE_0$ of the engine speed for the supply power excess determination is found correspondingly to the difference between the supply power and the generation power. Herein, there is no need to stock the integrated value $P_0$ by the integration processing for the next calculation. Hence, the control becomes simpler.

Also, a sum of the generation power and the charge and discharge power of the battery is equal to the supply power (also corresponding to the required power) to the external electrical device. Hence, the current detection unit may detect a charge and discharge current of the battery instead of the supply current. In a case where the charge and discharge current of the battery 8 is detected as above, the supply current is calculated. Hence, this configuration has advantages same as those obtained by the configuration in the embodiment above in which the charge and discharge power of the battery 8 is calculated by detecting the supply power. In this instance, the current detection unit detects whether a current flows into or flows out from the battery 8 in the supply power excess determination and the supply current is calculated on the basis of a sum of the charge and discharge current of the battery 8 and the generation current of the generator 2 in the supply power variance determination. Then, the engine speed is controlled by determining a variance of the supply current with time.

In a case where the rotational speed of the engine 1 is controlled correspondingly to the generation power of the generator 2, an intake air amount may be controlled by controlling a throttle opening or spark timing of the spark plugs 7 may be controlled. A variance of an intake air amount and a variance of a rotational speed of the engine 1 have a strong correlation, and the control of an intake air amount is suitable to control a rotational speed of the engine 1. Hence, it is possible to readily control a rotational speed of the engine 1 by the control of an intake air amount even in a motorcycle having the EMS 4 with a processing capability inferior to that of a four-wheel vehicle.

Also, in this embodiment, the vehicle power supply system includes a temperature detection unit that detects a temperature of the internal combustion engine. The control unit stops the internal combustion engine or suppresses a rotational speed of the internal combustion engine according to a detection result of the temperature detection unit. More specifically, when it is found out in the engine temperature determination that the detection temperature is higher than the first threshold and lower than the second threshold, the engine speed is suppressed whereas when it is found that the detection temperature is higher than the second threshold, the stop processing of the engine 1 is performed. It thus becomes possible to suppress adverse influences of heat on the peripheral components of the engine 1. In the case of a vehicle adopting an air-cooled engine, particularly, it becomes possible to suppress the engine from becoming extremely hot. Only one threshold may be set, so that the engine 1 is stopped or a rotational speed of the engine 1 is suppressed by comparing the engine temperature with this threshold.

In this embodiment, a supply of power to in-vehicle electrical components unnecessary for power supply to the external electrical device is stopped when power is supplied to the external electrical device. More specifically, in the processing to stop a load unnecessary in the feed mode, a supply of power to the electrical component 9, such as headlights 25, is stopped. Accordingly, sufficient power is supplied to the home electrical appliance 10. Also, there is no need for complex control as to in what ratio the power is supplied to the home electrical appliance 10 and the electrical component 9 when power is supplied to the both at the same time. Moreover, this embodiment is of a configuration suitable for a motorcycle in which both of generation power of the generator and a storage capacity of the battery are small.

Also, in this embodiment, the vehicle power supply system has the self-charge mode in which power is supplied to the battery by the generator without supplying power to the external electrical device. Hence, even when a storage capacity of the battery 8 is small, it becomes possible to charge the battery 8 efficiently without a need to move the vehicle by driving the vehicle.

In this embodiment, when charging of the battery is completed in the self-charge mode, the control unit stops the internal combustion engine and stops a supply of power from the battery to the control unit. More specifically, when the batter 8 is fully charged in the self-charge mode, the EMS 4 performs the engine stop processing and performs control to electrically disconnect the electrical connection between the battery 8 and EMS 4. It thus becomes possible to suppress consumption of fuel necessary for power generation by preventing wasteful power consumption without generating more than necessary power. Also, it is no longer necessary for the user to confirm whether the charging of the battery 8 is completed and then performs a manual operation. Hence, the user can leave the vehicle after the mode is set in the self-charge mode.

This embodiment has been described using a motorcycle as an example. It should be appreciated, however, that the invention is a vehicle power supply system available for various types of vehicle, such as automobiles, snowmobiles, ATVs (All-Terrain Vehicles), outboard motors, PWCs (Personal Watercrafts), and tractors. In particular, the invention is suitable for a motorcycle. A motorcycle is often includes a control unit having a processing capability inferior to that of a four-wheel vehicle. However, even such a control unit can perform control as simple as the one described in the embodiment above. Also, the generator 2 mounted to a motorcycle has a power generation capability inferior to that of a four-wheel vehicle and a capacity of the battery 8 is small. Hence, in a case where a motorcycle supplies the home electrical appliance 10 with power, it is highly likely that the motorcycle fails to supply power matching the required power of the home electrical appliance 10 because the battery 8 runs out of charge. However, by controlling generation power of the generator 2 little by little by making a charge amount of the battery 8 stable by supplying power by the generator 2 and the battery 8 as in the embodiment above, it becomes possible to steadily supply power matching the required power. Also, in small-size internal combustion engine and generator mounted on a motorcycle, an output current of the generator 2 tends to tilt gently in a relation of the output current with respect to a rotational speed of the engine as is shown in FIG. 4. Hence, control at a high degree of accuracy can be readily performed in the rotation speed control of the engine 1 for generation power. In addition, because the vehicle body of a motorcycle is small, in the event a power blackout in a time of disaster, the user can dash off to an affected area. The invention is therefore of a high utility value as a mobile power supplier to an external electrical device.

It should be appreciated that the invention is not limited to the first embodiment described above and can be of any configuration as long as the various advantages are achieved in a vehicle power supply system. For example, it may be configured in such a manner so as to add a function of giving a notice to the user or automatically stops the engine when fuel becomes low in the feed mode or the self-charge mode. When configured in this manner, it becomes possible to set aside the fuel needed to drive the vehicle to a nearby gas station. In addition, it is necessary to pay attention to electrification caused by moisture at a connected portion between the vehicle and the home electrical appliance 10. However, it is easy for a motorcycle to provide water-resistance against rain by providing a plug as the connected portion under a main seat or a tandem seat. Further, the vehicle may be connected to more than one home electrical appliance 10.

Various modifications and alterations of this invention will be apparent to those skilled in the art without departing from the scope and spirit of this invention, and it should be understood that this is not limited to the illustrative embodiments set forth herein.

What is claimed is:

1. A vehicle power supply system that supplies power from a generator driven by an internal combustion engine to an external electrical device through power conversion, the system comprising:
   a battery that is charged by the generator and supplies the external electrical device with power in response to an increase of power required by the external electrical device;
   a stop state detection portion that detects a drive stop state of the vehicle;
   a current detection unit that detects a supply current from the battery and the generator to the external electrical device;
   a supply current excess determination unit that calculates a charge and discharge state of the battery on the basis of whether the supply current exceeds or falls short of a generation current of the generator using a detection result of the current detection unit;
   a supply current variance determination unit that calculates a variation of the supply current using the detection result of the current detection unit; and
   a control unit that controls a rotational speed of the internal combustion engine according to a calculation result of the supply current excess determination unit and a calculation result of the supply current variance determination unit when the stop state detection portion detects a drive stop state of the vehicle.

2. The vehicle power supply system according claim 1, wherein
   the supply current excess determination unit integrates a difference between the supply current and the generation current and uses an integrated value as the calculation result.

3. The vehicle power supply system according to claim 1, wherein
   the supply current excess determination unit determines whether the battery is a charge state or a discharge state when a difference between the supply current and the generation power is calculated on the basis of the difference and uses the difference as the calculation result.

4. The vehicle power supply system according to claim 1, wherein
   the current detection unit detects a charge and discharge current of the battery instead of the supply current from the battery and the generator to the external electrical device.

5. The vehicle power supply system according to claim 1, wherein
   the control unit controls the rotational speed of the internal combustion engine by controlling an intake air amount of the internal combustion engine.

6. The vehicle power supply system according to claim 1, further comprising:
   a temperature detection unit that detects a temperature of the internal combustion engine,
   wherein the control unit performs one of a control to stop the internal combustion engine and a control to suppress the rotational speed of the internal combustion engine according to a detection result of the temperature detection unit.

7. The vehicle power supply system according to claim 1, wherein
   while power is supplied to the external electrical device, a supply of power to an in-vehicle electrical component unnecessary for a supply of the power to the external electrical device is stopped.

8. The vehicle power supply system according to claim 1, wherein
   the vehicle power supply system has a self-charge mode in which power is supplied to the battery by the generator without supplying the power to the external electrical device.

9. The vehicle power supply system according to claim 8, wherein
   the control unit stops the internal combustion engine and stops a supply of the power to the control unit when charging of the battery is completed in the self-charge mode.

10. The vehicle power supply system according to claim 1, wherein
    the vehicle power supply system is adopted for a motorcycle.

* * * * *